United States Patent [19]

Kajiwara et al.

[11] Patent Number: 4,986,736
[45] Date of Patent: Jan. 22, 1991

[54] PUMP IMPELLER

[75] Inventors: Kenichi Kajiwara, Kanagawa; Kikuichi Mori, Chiba; Hideo Ikeda, Kanagawa, all of Japan

[73] Assignee: Ebara Corporation, Tokyo, Japan

[21] Appl. No.: 466,845

[22] Filed: Jan. 18, 1990

[30] Foreign Application Priority Data

Jan. 19, 1989 [JP] Japan .................................. 1-8619

[51] Int. Cl.⁵ .......................... F04D 29/38; F01D 5/30
[52] U.S. Cl. .................................. 416/181; 416/182; 416/213 R; 403/259; 403/383
[58] Field of Search ............... 416/204 R, 213 R, 179, 416/181, 182; 403/259, 261, 356, 383, 365; 29/889.21, 888.02

[56] References Cited

U.S. PATENT DOCUMENTS

| | | | |
|---|---|---|---|
| 3,019,039 | 1/1962 | Clavell | 416/204 R |
| 3,213,794 | 10/1965 | Adams | 416/181 |
| 4,080,079 | 3/1978 | Waara | 403/57 |
| 4,285,305 | 8/1981 | Kaufman et al. | 403/256 |
| 4,337,747 | 7/1982 | Jefferson et al. | 29/888.02 |
| 4,693,136 | 9/1987 | Clerc et al. | 403/383 |
| 4,720,242 | 1/1988 | Lovisetto | 416/186 A |
| 4,890,980 | 1/1990 | Heald et al. | 416/181 |
| 4,925,369 | 5/1990 | Steiner et al. | 416/204 R |

FOREIGN PATENT DOCUMENTS

| | | | |
|---|---|---|---|
| 2215551 | 8/1974 | France | |
| 57-52397 | 11/1982 | Japan | |
| 0144697 | 8/1983 | Japan | 416/213 R |
| 0123701 | 6/1986 | Japan | 416/213 R |

OTHER PUBLICATIONS

Patent Abstracts of Japan, vol. 7, #179 (M-234) (1324), Aug. 9, 1983.

*Primary Examiner*—Edward K. Look
*Assistant Examiner*—Hoang Nguyen
*Attorney, Agent, or Firm*—Armstrong, Nikaido, Marmelstein, Kubovcik & Murray

[57] ABSTRACT

A pump impeller manufactured by press forming of steel plate and comprising a boss formed with a central bore for connecting the boss to a main shaft of the pump through key and key way engagement, and a main shroud fixed to the boss is disclosed. The impeller is characterized in that the boss is formed with a polygonal portion on the periphery of the boss and the main shroud is formed at central portion thereof with a polygonal recess fitting to the polygonal portion of the boss. A retainer plate is mounted on the boss at an end portion thereof opposite to an end portion from which the main shroud is fitted to the boss and is connected by welding to the main shroud. Thereby, since the power is transmitted from the boss to the main shroud through polygonal surfaces, no substantial stress concentration occurs at the power transmitting area.

10 Claims, 6 Drawing Sheets

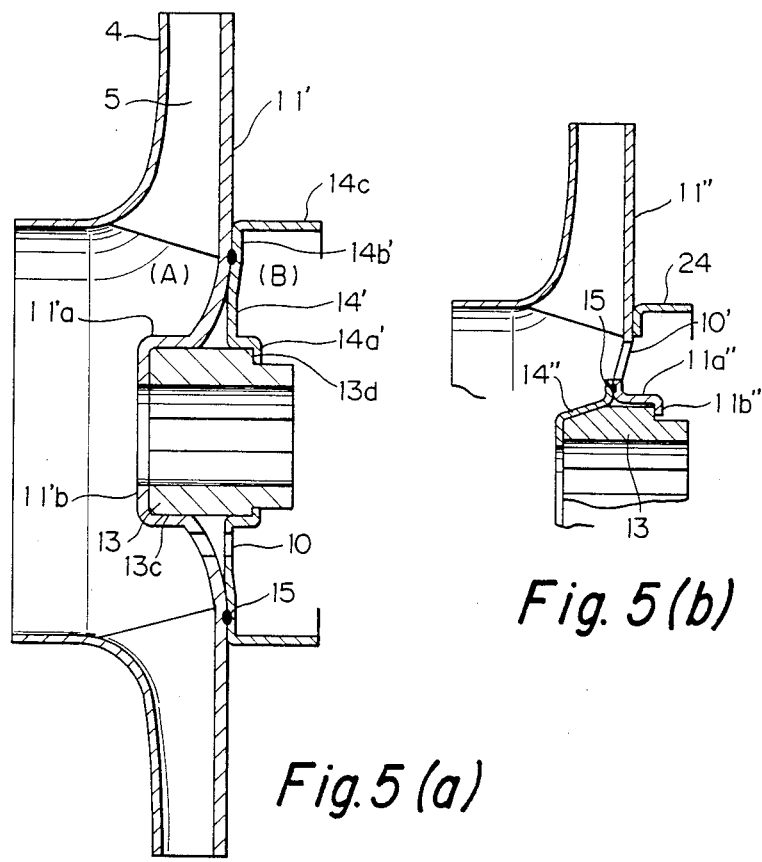

PUMP IMPELLER

BACKGROUND OF THE INVENTION

1. Filed of the Invention

The present invention relates to a pump impeller manufactured by press forming of steel plate, which is advantageously used as an impeller of a centrifugal pump made of steel plate.

2. Prior Art

Conventional pump impellers manufactured by press forming of steel plate are generally classified into two groups with respect their structure, namely, (a) two engaging planes type, and (b) boss welding type.

FIGS. 6(a) and 6(b) are a front view and a side sectional view, respectively, of a main portion of an impeller according to the two engaging planes type (a). In this type, a retainer plate 2 is fixed to the central portion of the impeller main shroud 1. The main shroud 1 and the retainer plate 2 are both formed with circular bores 3 having two parallel engaging planes for fitting to a main shaft (not shown) having the same cross-sectional shape, and connected with each other in an axial direction by means of screws. In the figures, numeral 4 denotes a side plate, and numeral 5 an impeller blade.

FIGS. 7(a) and 7(b) are a front view and a side sectional view, respectively, of a main portion of an impeller according to the boss welding type (b). In these figures, the same numerals as in FIGS. 6(a) and 6(b) indicate the same or similar portions. In this type, a boss 6 is formed, through such as machining, with a slunt or conical surface 6a on the front side (suction side) of the impeller, a step portion 6b on the rear end of the conical surface 6a, and a cylindrical surface 6c of a smaller diameter adjacent to the step portion 6b. The impeller main shroud 1A is formed with a central aperture. The main shroud is fitted to the boss with its central aperture fitting on the cylindrical surface 6c and with its central portion abutting on the step portion 6b, and then the main shroud and the boss are connected with each other by welding 7 between the rear portion of the conical surface 6a and the abutting portion of the main shroud 1A.

In the impeller of the two engaging planes type of the prior art shown in FIGS. 6(a) and 6(b), however, the impeller main shroud 1 and the main shaft are engaged with each other through the two circular holes 3 having two engaging planes. In this case, therefore, a torque for the impeller is borne only by a small area extending over the thickness of the main shroud 1 and the retainer plate 2. In consequence, the impeller of this type can not be used, when the required power or torque is great, and further the impeller of this type is easily affected by vibration due to such as a radial thrust or force. In addition, the shaft is required to have a special cross-sectional shape and, thus needs troublesome machining.

In the impeller of the boss welding type of the prior art shown in FIGS. 7(a) and 7(b), the impeller mainplate 1A and the boss 6 are fitted to each other and welded to each other. In this case, however, since arc welding is required around the periphery of the boss for assuring a sufficient strength, there is great thermal deformation caused, and therefore, the central hole of the boss is required to be remachined after welding. On the other hand, if the boss and the main shroud are welded to each other by projection welding at several positions as shown in FIG. 7(a), the remachining may not be required, but the impeller cannot withstand great torque or power because of an insufficient strength at the welded points.

Further, in both of the above-mentioned welding cases, there is the problem that high reliability can not be expected, because the welding portion is positioned at the regions where stress concentrations occur.

SUMMRY OF THE INVENTION

Therefore, an object of this invention is to provide a pump impeller in which the welded portion of the impeller suffers no significant stress concentration and thereby makes the adoption of simple welding processes possible.

Another object of this invention is to provide an impeller in which transmission of power from the boss to the impeller main shroud is effected through relatively large area and whereby stress concentration at the transmission area is avoided.

Still another object of this invention is to provide an impeller in which the boss suffers no thermal deformation upon welding and no additional machining is required to the boss after welding.

A further object of this invention is to provide an impeller in which no special cross-sectional shape is required of the impeller main shaft.

For achieving the above-mentioned objects of the present invention, it is characterized in that the pump impeller comprises a boss formed with a polygonal portion on the periphery of the boss and with a bore at a central portion of the boss for connecting the boss with a main shaft, a main shroud formed with a polygonal recess for fitting to said polygonal portion, and a retainer plate mounted on an end position of the boss opposite to the end portion from which the main shroud is fitted to the boss and the retainer plate is connected with the main shroud by welding.

Further, it is desirable that the boss is formed with a radial step on said polygonal portion at the rear end thereof, that the main shroud is formed with a skirt portion radially inwardly extending from an end of said recess, and that the skirt portion is abutted on and engaged with the radial step. When the main shroud is fitted to the boss from front end thereof, however, a radially inner portion of said retainer plate may be abut said radial step.

In the above-mentioned arrangements of the present invention, for assembling the impeller, the polygonal portion formed on the periphery of the boss is fitted to the polygonal recess of the impeller main shroud, and the retainer plate, which is mounted on the boss from the side opposite to the main shroud mounting side, is welded to the main shroud. Thus, the main shroud is surely secured to the boss, which is fixed, in turn, to the main shaft by means of such as a key way.

In operation of the pump, the torque is transmitted from the main shaft to the boss through such as a key, and then, to the main shroud through the surfaces of the polygonal portion of the boss and the corresponding surfaces of the polygonal recess of the main shroud, thereby delivering the water from the impeller.

As mentioned above, since the torque is transmitted from the main shaft to the boss through the surfaces of the polygonal portion of the boss and the corresponding surfaces of the recess of the main shroud, there is no severe stress concentration at this torque transmitting portion, and also no significant stress at the welding portion.

The above and other objects, features and advantages of the present invention will become more apparent from the following description when taken in conjunction with the accompanying drawings in which preferred embodiments of the present invention are shown by way of illustrative examples.

BRIEF DESCRIPTION OF THE DRAWINGS

FIG. 5(a) is a longitudinal sectional view of an impeller according to another embodiment of the present invention, FIG. 5(b) is a longitudinal sectional view of a portion of an impeller according to a further embodiment of the invention.

DETAILED DESCRIPTION OF THE PREFERRED EMBODIMENTS

Figure 1:
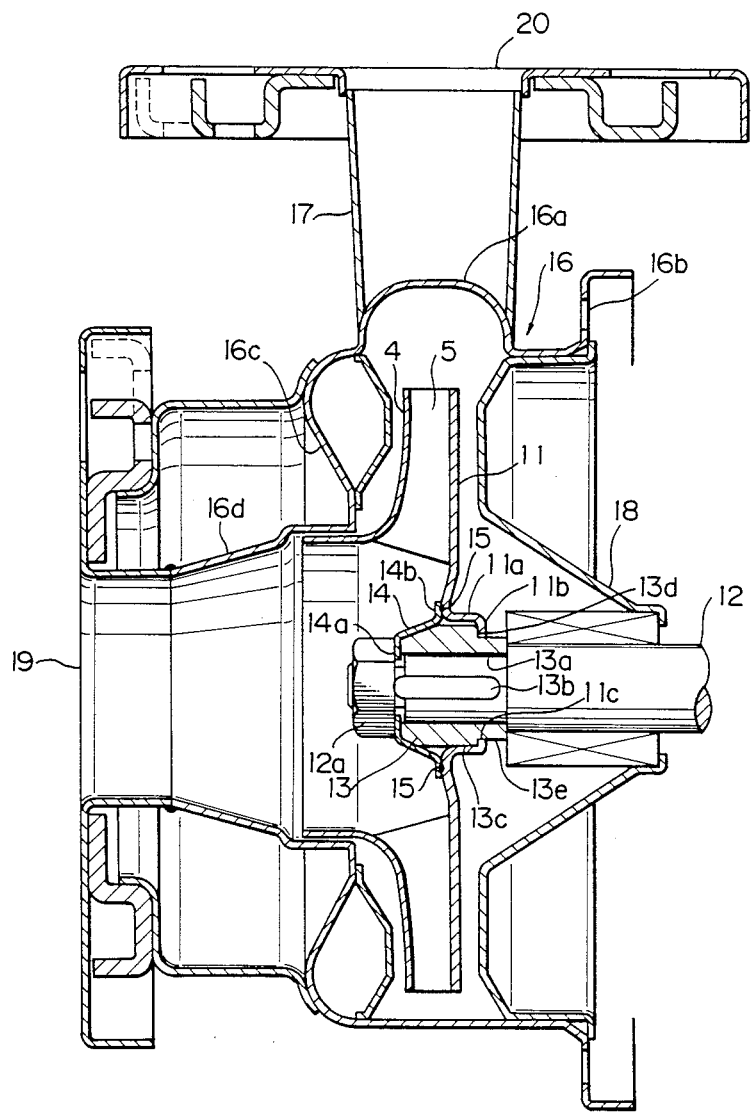
FIG. 1 is a longitudinal sectional view of a centrifugal pump made of steel plate and provided with an impeller according to an embodiment of the present invention.

Referring to the drawings, embodiments of the present invention will be described below.

FIG. 1 is a longitudinal sectional view of a centrifugal pump having an impeller made of steel plate according to an embodiment of the present invention.

Figure 2A:
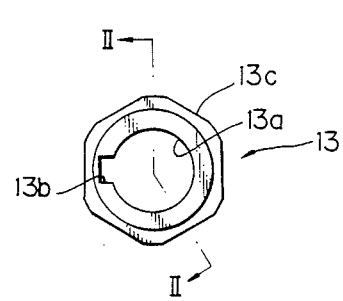
FIG. 2(a) is a front view of the boss.
Figure 2B:
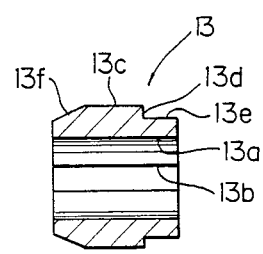
FIG. 2(b) is a sectional view taken on line II—II of FIG. 2(a)

In the figure, a boss 13 is provided for mounting an impeller main shroud 11 on a main shaft 12. As shown in FIGS. 2(a) and 2(b), the boss 13 is formed at its central (inner circumference side) portion with a bore 13a which is adapted to fit to the main shaft 12, and on a part of the bore with a key way 13b for power transmitting. The boss is further formed with a polygonal (hexagonal in the figure) portion 13c on the periphery of the boss at the axially middle portion of the same, the polygonal portion being adapted to fit to the impeller main shroud 11 as will be explained hereunder. At the main shroud fitting side (right side in the figure) of the polygonal portion 13c is formed with a radial step 13d, adjacent to which is formed a cylindrical surface 13e of a smaller diameter, the radial step 13d and the cylindrical surface 13e determine the axial position of the main shroud.

Figure 3A:
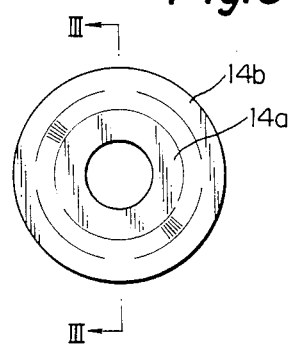
FIG. 3(a) is a front view of the retainer plate.
Figure 3B:
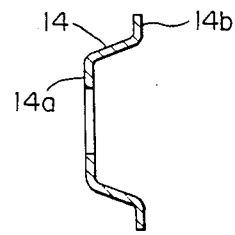
FIG. 3(b) is a sectional view taken on line III—III of FIG. 3(a)

On the side opposite to the main shroud fitting side, namely, on the suction side (left side in the figure), there is formed a slant or conical surface 13f which is machined to have a tapered shape converging in the forward direction, and adapted to fit to a correspondingly shaped retainer plate 14. A front end portion 14a of the retainer plate 14 (see FIGS. 3(a) and 3(b) is, upon assembling of an impeller, gripped between a nut 12a for the main shaft and the front surface of the boss 13, while a rear end portion 14b abut on the main shroud 11. The middle portion of the retainer plate has a tapered shape corresponding to the slant surface 13f of the boss 13. This tapered shape of the retainer plate allows smooth suction flow of the pumped water into the impeller and whereby increases pump performance.

Figure 4A:
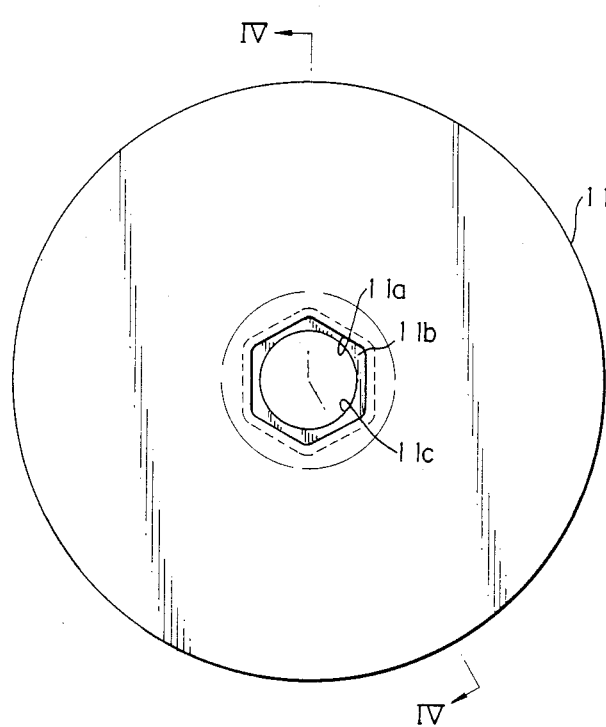
FIG. 4(a) is a front view of the main shroud.
Figure 4B:
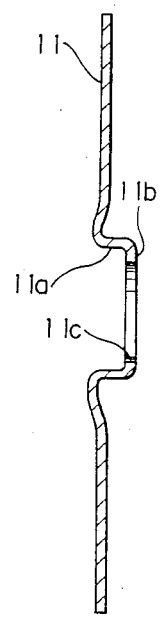
FIG. 4(b) is a sectional view taken on line IV—IV of FIG. 4(a)

On the other hand, as shown in FIGS. 4(a) and 4(b), the impeller main shroud 11 is formed by press forming at its central portion with a polygonal (hexagonal in the figure) tubular recess 11a which has the same shape as that of the polygonal portion 13c formed on the periphery of the boss. A skirt portion 11b extending radially inwardly from an end of the recess 11a is formed with a circular aperture 11c for fitting to the cylindrical surface 13e of the boss 13, and said skirt portion abuts on the step 13d of the boss 13.

Upon assembling of an impeller, as mentioned above, the polygonal portion 13c formed on the periphery of the boss and the polygonal recess 11a formed in the main shroud 11 fit to each other, and the step 13d formed on the periphery of the boss and the radially inwardly extending skirt portion 11b of the main shroud 11 abut on each other. In consequence, the main shroud 11 is fitted to the boss 13. On the other hand, the retainer plate 14 is mounted on the boss from the side opposite to the main shroud fitting side, and the rear end or radially outer portion 14b of the retainer plate 14 is strongly secured to the main shroud 11 by a projection welding or a spot welding 15.

Figure 6A:
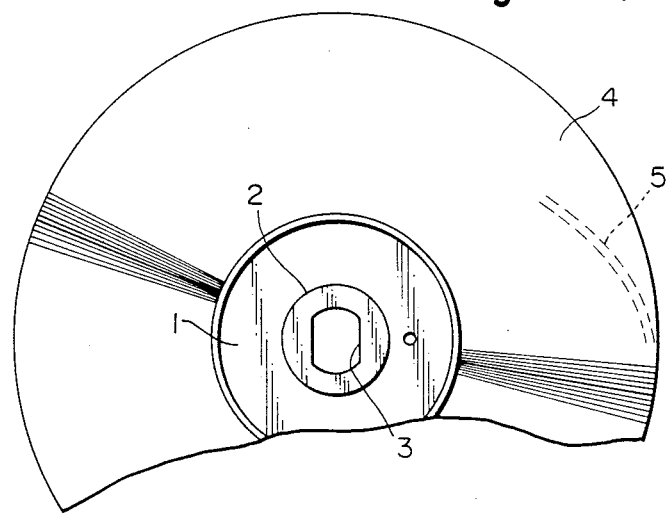
FIG. 6(a) is a front view of a main portion of a conventional impeller.
Figure 6B:
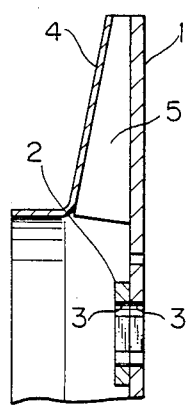
FIG. 6(b) is a side sectional view of the conventional impeller.
Figure 7A:
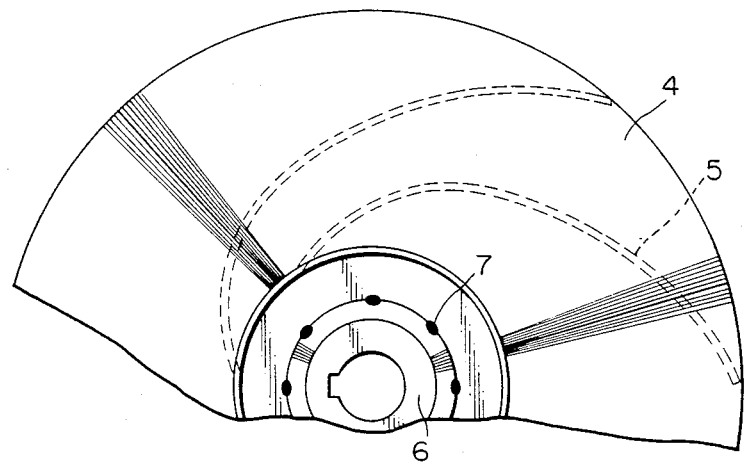
FIG. 7(a) is a front view of a main portion of an another conventional impeller.
Figure 7B:
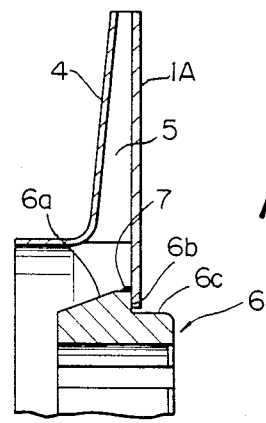
FIG. 7(b) is a side sectional view of the other conventional impeller.

Incidentally, the impeller blade 5 and the front shroud 4 are secured to the main shroud 11, by welding, similarly to in prior arts shown in FIGS. 6 and 7. In the figure, numeral 16 denotes a casing body manufactured from a steel plate by press forming, numeral 16a a volute expanded portion, numeral 16b a casing flange, numeral 16c a casing front portion, numeral 16d a suction port portion, numeral 17 a nozzle connecting the maximum portion of the volute with a discharge port 20, numeral 18 a casing cover, and numeral 19 a suction port.

By virtue of the above-mentioned arrangement, when the pump is operated, the torque is transmitted from the main shaft 12 through the key and key way to the boss 13, and then to the main shroud 11 through the polygonal portion formed on the periphery of the boss and polygonal recess of the main shroud, thereby delivering out the water under the function of the impeller. Since the torque transmitted from the main shaft 12 to the boss 13 is further transmitted to the main shroud 11 as stated above, the transmission of the torque is conducted through polygonal surfaces. In consequence, no substantial stress concentration at the torque transmitting portion can occur, and no significant stress acting in a rotational direction is produced at the welding portion 15.

Further, due to the rotation of the impeller, there is generated an axial thrust directing from the rear side of the impeller toward the suction port 19. However, this axial thrust is borne by the engagement between the radially inwardly extending skirt portion 11b of the main shroud 11 and the step portion 13d of the boss 13, and then transmitted through the main shaft 12 and borne by a thrust bearing not shown. In consequence, the welding portion 15 suffers no significant stress in an axial direction either.

Although in the above-mentioned embodiment, the cross-section of the polygonal portion 13c formed on the periphery of the boss 13 is hexagonal, any polygonal shape other than hexagon will do.

FIG. 5(a) is a longitudinal sectional view of an impeller formed as a double-liner ring type one according to another embodiment of the present invention. The same numerals in the figure as in FIG. 1 denote the same members or portions. In this embodiment, the direction of the recess 11a' of the main shroud 11' is the reverse in comparison with that in the embodiment shown in FIG. 1, and the radially inwardly extending skirt portion 11b' abuts on the front end surface of the boss 13. In keeping with this arrangement, a radially inner end portion 14a' of the retainer plate 14' engages with the step portion 13d of the boss 13, and a radially outer end portion 14b' is axially extended to form a cylindrical portion, i.e. a liner ring 14c. Further, the main shroud 11' and the retainer plate 14' are formed near their central portion with a plurality of holes (balance hole) 10, which functions to balance the pressure at region (B) radially inside of the liner ring 14c with that at the suction side region (A). In this embodiment, a similar function as in the before-mentioned embodiment can be also obtained.

FIG. 5(b) is further embodiment of an impeller for a double-liner ring type according to the invention. In this embodiment, a main shroud 11" and a retainer plate 14" are similar to those shown in FIG. 1, but a separate liner ring 24 is provided on the rear surface of the impeller to form a double-liner ring type impeller.

According to the present invention, the following advantages are obtained.

(1) Since the welded portion suffers no significant stress, welding processes of a simpler type can be adopted, and the reliability of the welded portion is improved.

(2) Since the power is transmitted from the boss to the main shroud through the polygonal surfaces, no substantial stress concentration occurs at the power transmitting area.

(3) Since the welded portion is apart from the regions where a precise machining is required such as central bore of the boss, and suffers no thermal deformation, additional machining after assembling is not required.

(4) Since no special cross-sectional shape of the shaft is required differently from in the prior art of the two engaging planes type, an interchangeability exists between an impeller of this invention and an impeller manufactured by casting or the like, wherein a key and key way engagement between the shaft and the boss can only be adopted.

(5) For the above-mentioned reasons, an impeller capable of handling great load can be manufactured by press forming.

What is claimed is:

1. A pump impeller manufactured by press forming of steel plate and comprising a boss formed with a central bore for connecting said boss to a main shaft of said pump through key and key way engagement, and a main shroud fixed to said boss, said impeller characterized in that said boss is formed with a polygonal portion on the periphery of said boss, that said main shroud is formed at central portion thereof with a polygonal recess fitting to said polygonal portion of said boss, that a retainer plate is mounted on said boss at an end portion thereof opposite to an end portion from which said main shroud is fitted to said boss, and that said retainer plate is connected by welding to said main shroud.

2. A pump impeller claimed in claim 1, wherein said main shroud is fitted to said boss from rear end thereof, and said retainer plate is mounted on a front end of said boss.

3. A pump impeller claimed in claim 1, wherein said main shroud is fitted to said boss from front end thereof, and said retainer plate is mounted on a rear end portion of said boss.

4. A pump impeller of claim 2, wherein said boss is formed with a radial step on said polygonal portion at rear end thereof, said main shroud is formed with a skirt portion radially inwardly extending from an end of said polygonal recess, and said skirt portion is abutting said step portion.

5. A pump impeller claimed in claim 3, wherein said boss is formed with a radial step on said polygonal portion at rear end thereof, and a radially inner portion of said retainer plate is abutting said step portion.

6. A pump impeller claimed in any one of claims 1 to 5, wherein said boss is formed with a slant surface on a front end side thereof.

7. A pump impeller claimed in claim 1 or 2, wherein said boss is formed with a slant surface on a front end side thereof, and said retainer plate includes in middle portion thereof a tapered portion corresponding to said slant surface of said boss.

8. A pump impeller claimed in any one of claims 1 to 5, wherein said retainer plate is welded to said main shroud at radially outer portion thereof.

9. A pump impeller claimed in claim 3, wherein said retainer plate includes an axially extending liner ring at radially outer end portion thereof, and a plurality of balance holes are formed passing through said main shroud and the retainer plate to form thereby a double-liner ring type impeller.

10. A pump impeller claimed in claim 2, wherein an axially extending liner ring is provided on rear surface of said main shroud, and a plurality of balance holes are formed passing through said main shroud to form thereby a double-liner ring type impeller.

* * * * *